Figure 1:
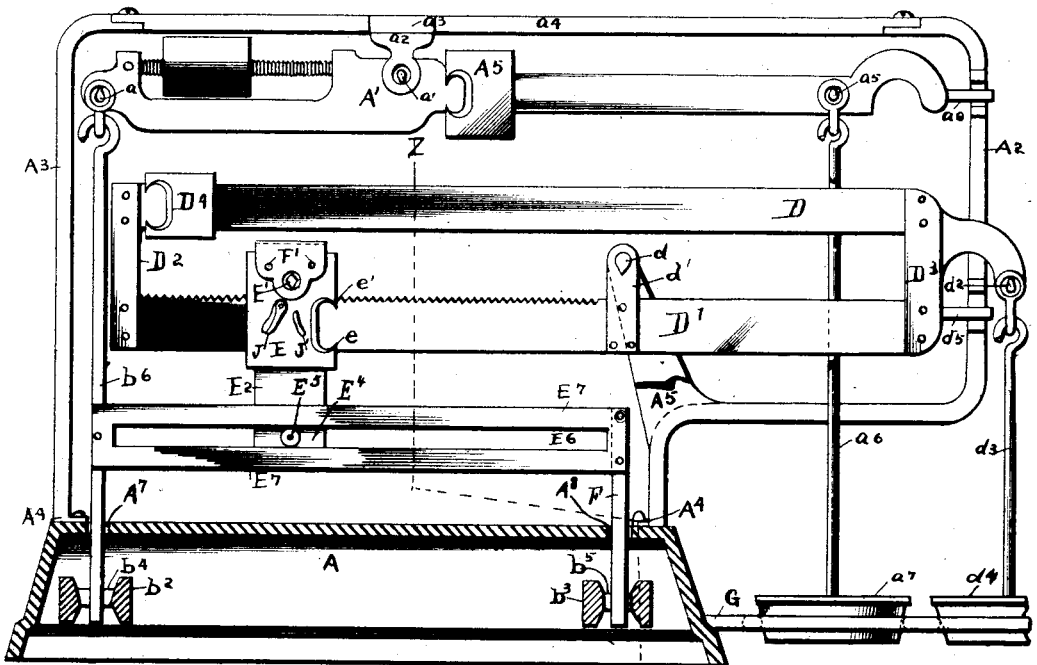

No. 790,794. PATENTED MAY 23, 1905.
I. C. KOEHNE.
PRICE COMPUTING SCALE.
APPLICATION FILED SEPT. 9, 1896.

2 SHEETS—SHEET 1.

WITNESSES
L. C. Leoty
Geo. Greenway

INVENTOR
I. C. Koehne

No. 790,794. PATENTED MAY 23, 1905.
I. C. KOEHNE.
PRICE COMPUTING SCALE.
APPLICATION FILED SEPT. 9, 1896.
2 SHEETS—SHEET 2.
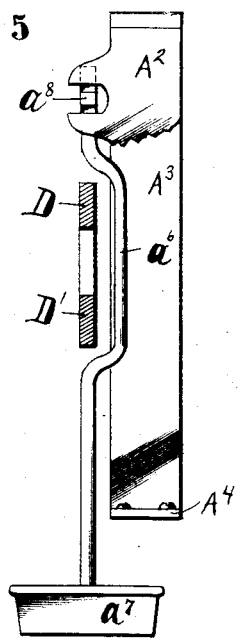
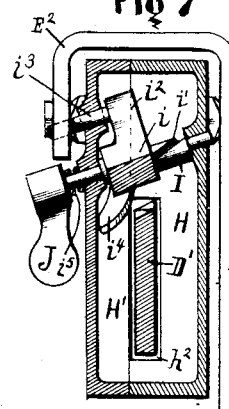
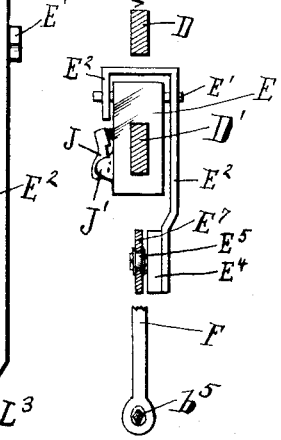
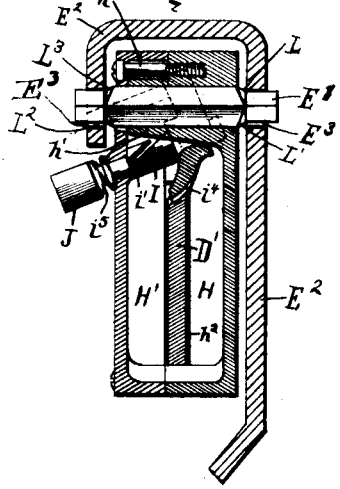
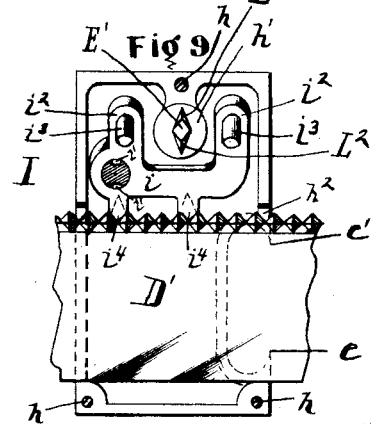
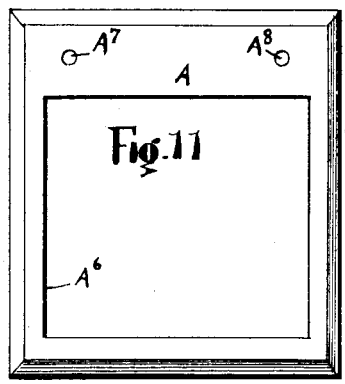
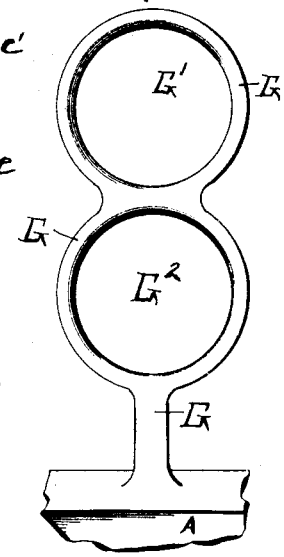
WITNESSES
INVENTOR No. 790,794. Patented May 23, 1905.

UNITED STATES PATENT OFFICE.

IRA C. KOEHNE, OF COLUMBUS, OHIO, ASSIGNOR, BY MESNE ASSIGNMENTS, TO THE COMPUTING SCALE COMPANY, A CORPORATION OF OHIO.

PRICE-COMPUTING SCALE.

SPECIFICATION forming part of Letters Patent No. 790,794, dated May 23, 1905.

Application filed September 9, 1896. Serial No. 605,256.

*To all whom it may concern:*

Be it known that I, IRA C. KOEHNE, a citizen of the United States, residing at Columbus, in the county of Franklin, State of Ohio, have invented a new and useful Improvement in Price-Computing Scales; and I do hereby declare that the following is a full, clear, and exact description of the invention, which will enable others skilled in the art to which it appertains to make and use the same when this exclusive grant shall have expired.

This invention relates to improvements in that particular class of scales wherein the leverage of the scale is varied proportionate to the rate unit by the relative shifting or movement of the price-beam and a connection between the price-beam and the weighing mechanism, said connection engaging with the weighing mechanism or a part thereof in such manner that the action of said weighing mechanism upon said connection is constant and uniform whatever may be the relative position of said connection and price-beam and the leverage is only changed by the relative position of said connection with respect to the fulcrum-pivot of the price-beam. Should said connection occupy a relative position close to the fulcrum of the price-beam, the price or rate unit will be small, and this price or rate unit increases uniformly as the relative distance is increased from the fulcrum of said price-beam. In the instance shown in the drawings if this connection when set to occupy a relative distance of two inches from the fulcrum-pivot of the price-beam indicates prices at the rate of five cents per pound it will when four inches away from said fulcrum indicate prices at ten cents per pound, and so on, the regular increments occupying uniform distances.

The present invention has for its object the simplifying of the construction and operation of weighing and price scales of the various forms well known in the art, whereby they can be made at less cost and are rendered more durable and effective in operation and less liable to work otherwise than free and easy or become inoperative through or broken by rough handling or want of adroit manipulation, the invention relating more particularly, but not exclusively, to that form of price-scale employing a longitudinally-movable rate-changing connection between the price-beam and the load-receiver.

Figures 2, 3, 4:
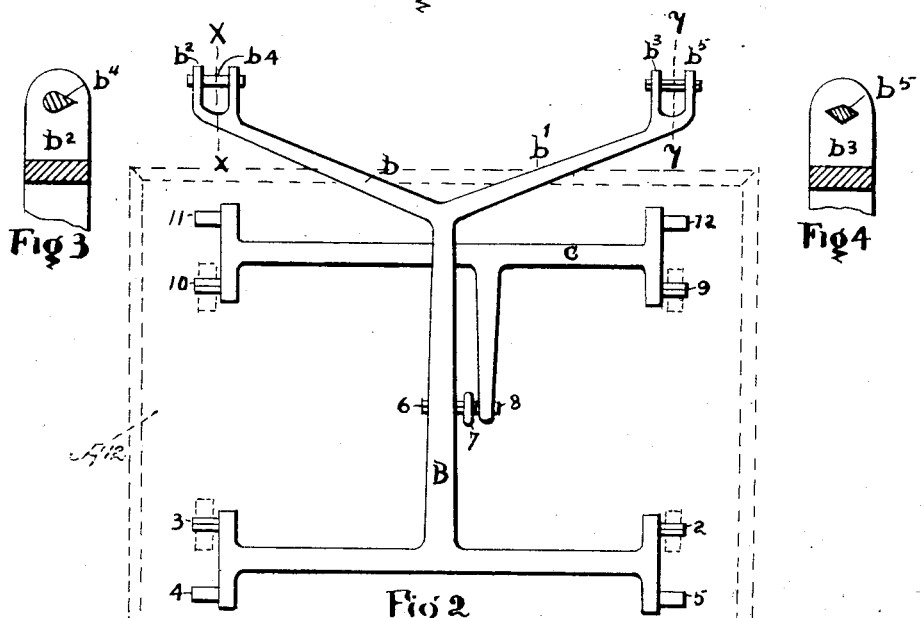

Referring to the drawings, Figure 1 is a front elevation of a machine, illustrating my invention and having the frame A and platform-connecting lever B in section. Fig. 2 is a plan view of the levers B and C, which support the platform or weight-receiving member in the usual manner, said platform being shown in dotted lines. Fig. 3 and Fig. 4 are sections, respectively, on line X X and Y Y of Fig. 2. Fig. 5 is an end view of the framework, partially broken away to illustrate the manner in which the counterpoise-rod of the weighing-beam is bent to one side of and around the price-beam. Fig. 6 is a sectional view on line Z Z of Fig. 1 and omitting the framework among other parts. Fig. 7 is a sectional view of the rate-poise, said poise being unlocked from the price-beam. Fig. 8 is a central vertical section of the rate-poise and its connection and illustrating the poise as being locked to the price-beam. Fig. 9 is a front elevation of the rate-poise with its face-plate H' removed. Fig. 10 is a plan view of the guard G, and Fig. 11 is a plan view of the base-casting A.

Like characters of reference are employed to indicate similar parts throughout the several views.

A represents the base-casting of an ordinary platform-scale having pivoted therein in the usual manner the platform-supporting levers B and C, which levers are pivoted together in the customary manner. The lever C is of the usual or ordinary construction, while the outer or free end of lever B differs from the ordinary construction in that this end of lever B is bifurcated, forming arms $b$ and $b'$, diverging outward and forward, which arms terminate in bifurcated portions $b^2$ and $b^3$, in which is respectively secured a knife-edged pivot $b^4$ and a diamond-shaped pivot $b^5$. The pivot $b^4$ engages with the lower end of the steelyard-rod $b^6$, which connects at its upper end with the loop of the load-pivot $a$ of the weighing-beam A', whose fulcrum-pivot $a'$ rests in bracket $a^2$, rigidly secured to projection $a^3$ of frame-piece $a^4$, carried upon standards $A^2$ $A^3$, rising from the base-casting A, to which said standards are secured by means of their integral feet $A^4$. The weighing-beam A' is provided with the usual poise $A^5$, registering with a series of suitable weight graduations upon the beam, while from the counterpoise-pivot $a^5$ is suspended a counterpoise-rod $a^6$, to the lower end of which is secured a weighted cup $a^7$. The outer free end of beam A' is provided with an indicating-needle $a^8$, moving in an open slot formed in standard $A^2$ for the purpose of confining the movement and indicating the action of said weighing-beam.

A price-beam formed of horizontal bars D and D', connected at their respective outer ends by castings $D^2$ and $D^3$, is pivoted by a fulcrum-pivot $d$, rigid in part $d'$, secured to bar D', said fulcrum $d$ resting in suitable seats in the upper ends of a U-shaped standard $A^5$, rising from the standard $A^2$. The casting $D^3$ carries the counterpoise-pivot $d^2$ of the price-beam, from which is suspended the counterpoise-rod $d^3$, to the lower end of which is secured the weighted counterpoise-cup $d^4$. The bar D of the price-beam bears suitable money-graduations, (not shown,) which are indicated in the usual manner by poise $D^4$ sliding on said bar. The left-hand end of bar D' of the price-beam (see Fig. 1) is provided on its upper edge with a series of V-shaped notches cut at an angle, as shown in Figs. 1 and 9. On this notched portion of bar D' a poise E is adapted to slide, said poise being provided with projections $e$ and $e'$, adapted to indicate a series of rate-per-pound graduations. (Not shown for clearness.) This poise E is provided with a diamond-shaped pivot E', whose upper knife-edge is normally in line with the knife-edges of pivots $d$ and $d^2$. The upper and lower edges of pivot E' are alone knife-edges, and this pivot carries in the instance shown an L-shaped connection $E^2$ by reason of said pivots engaging in apertures $E^3$, formed in said part $E^2$. The lower end of this substantially L-shaped part $E^2$ is provided in this instance, although not necessarily, with a boss $E^4$, to the center of which is in the instance shown pivoted a grooved roller $E^5$, engaging in the instance shown in a slot $E^6$, formed in the track-piece $E^7$. This slot $E^6$ extends substantially the length to which the poise E is capable of being moved. This track-piece $E^7$ is mounted a slight distance below the price-beam, and the weighing-beam A', the price-beam, and the track-piece $E^7$ are all in vertical alinement. This track-piece $E^7$ is in the instance shown loosely pivoted at one end to the steelyard-rod $b^6$, while its remaining end is secured to the upper end of a rod F, whose lower end is provided with a circular opening engaging in the instance shown the diamond-shaped pivots $b^5$ of the main platform-lever B. The track $E^7$ is loosely pivoted to the steelyard-rod $b^6$ in such manner as to prevent lateral movement of said track-piece, but to permit a limited vertically-swinging movement of said track-piece $E^7$ in order to prevent strains on said track-piece and the pivots $b^4$ and $b^5$ due to slight variations in the size of parts, and, furthermore, to permit the upper or lower knife-edge of the diamond-shaped pivot $b^5$ to engage freely with the respective upper and lower sides of its engaging opening in the lower end of rod F.

The price-beam, as shown in Fig. 1, does not extend to the left quite as far as the steelyard-rod $b^6$. Consequently said rod $b^6$ is here shown to be formed perfectly straight. However, inasmuch as the weighing-beam A' is vertically above the price-beam and said price-beam extends to the right beyond said counterpoise-rod $a^6$ I have bent said counterpoise-rod $a^6$ to one side of and around the said price-beam, as shown in Figs. 1 and 5.

To prevent the swinging of the weighted counterpoise-cups $a^7$ and $a^4$, I provide a guard G, secured to or integral with the base-casting A, said guard G being provided with openings G' and $G^2$, (see Figs. 1 and 10,) which openings loosely embrace and limit the movement of said counterpoise-cups.

The poise E is formed, preferably, of a hollow shell H and an attached recessed plate H', (see Figs. 7, 8, and 9,) said parts being screwed together by screws $h$. The knife-edged pivot E' of poise E is rigidly mounted in a boss $h'$ integral with the shell H, said boss extending within the recess of the plate H', while the opening in plate H', through which said pivot passes, is slightly larger than the size of said pivot E', which construction permits the plate H' to be secured to and removed from the shell H without disturbing or straining the pivot E'. This shell H, Figs. 7, 8, and 9, is provided with a recess $h^2$ to permit the passage of bar D' therethrough, said recess being slightly deeper and wider than said bar D' in order to permit the free movement of said poise E on bar D'.

On the left-hand side of poise E (see Figs. 1, 7, 8, and 9) and above the bar D' is in the instance shown a spirally-threaded shaft I, extending in the instance shown at an angle and parallel with the angle on which the notches in bar D' are cut. The respective ends of this shaft I are reduced in diameter to form shouldered bearings in the respective plates H and H', forming said poise E. Mounted freely upon the threaded portion of shaft I is a forging $i$, provided with projections engaging in the spiral grooves $i'$, formed in shaft I for the purpose of causing said forging $i$ to be moved downward and upward by reason of the angle of inclination of said shaft I, accordingly as shaft I is revolved in one direction or the other. The forging $i$ is provided in the instance shown with upwardly-extending arms $i^2$, arranged to extend on opposite sides of the boss $h'$. In the upper ends of these arms $i^2$ are in the instance shown formed pins or bearings $i^3$, moving from one level to another in openings formed in the face-plate H' of poise E. (See Fig. 7.) These pins $i^3$ are in the instance shown arranged parallel to the shaft I and are adapted to prevent the turning of forging $i$, as well as to lock and prevent the swinging movement of the rate connection, as hereinafter more fully explained. The forging $i$ is provided in the instance shown on its under side with a series of V-shaped projections $i^4$, adapted to engage with and fit the notches on the upper side of bar D'. (See Figs. 7, 8, and 9.) These notches in the bar D' are in the instance shown cut at an angle substantially parallel with shaft I, and these notches are also tapered from the front to the back, (see Figs. 7, 8, and 9,) which forms a notch whose crown forms a sharp line sloping upward and rearward from the root-line of these teeth or notches. With this formation of notch and the sloping faces of the V-shaped projections $i^4$ it will be readily seen that when forging $i$ is shifted to the right in Figs. 7 and 8 by the rotation of its shaft I the notches in the bar D' will be firmly engaged by the projections $i^4$ and the poise E thus firmly locked to the bar D', while a spring $i^5$ on the forward end of shaft I and having its ends secured, respectively, to the face-plate H' and a handle or thumb-piece J rigidly attached to the extreme outer end of this shaft I keeps the poise E firmly locked to the bar D'. The ends of pivot E' (see Figs. 7 and 8) are of slightly-decreased vertical diameter, thus forming V-shaped shoulders L, L', L², and L³, which in conjunction with the straight internal or lateral edges of openings E³ in connection E² form knife-edged lateral bearings between said pivot E' and said connection E², which reduces the friction of any side draft upon or lateral displacement of said poise or said connection E². The upper and lower edges of pivot E' are alone knife-edges. Rigidly mounted upon the face-plate H' and adjacent to the thumb-piece J is an operating projection J', Figs. 1 and 6, for the purpose hereinafter specified. The pins or bearings $i^3$ are adapted in the instance shown to abnormally engage in closely-fitting recesses or bearing-seats F', Figs. 1 and 7, on opposite sides of the points of pivotal connection between said parts E², E, and E⁵ for the purpose of changing the pivotal connection between track E⁷ and the price-beam into a non-pivotal connection and preventing the lateral swinging or the getting out of a vertical position of said vertical connection between said track and the price-beam, and thereby maintaining the relative vertical position of the poise E and roller E⁵ or their equivalent members longitudinally movable, respectively, on the price-beam and said track E⁷ at all times during the changing of the rate per unit, so that when the rate-unit is changed the members E, E⁵, and E² will be in vertical alinement and said non-pivotal connection will be changed to a pivotal one to permit said vertical connection E² to compensate for the varying arcs produced by the changing of said connection to the different rates upon the price-beam. Said pins $i^3$ in the instance shown form the means for accomplishing the aforesaid purpose in the instance shown by rigidly locking the connection E² to its poise E in a perpendicular position preliminary to and during the moving of said poise in changing the rate per unit and then releasing said pivotal connection E² after the rate per unit has been changed.

The knife-edges $b^4$ and $b^5$ of the platform-supporting lever B are arranged vertically below and in line with the track E⁷, the price-beam, and the weighing-beam A' for the purpose of avoiding any side draft or undue strain upon the connections between said pivots and the respective beams.

The casting D³ of the price-beam is provided with an indicating-needle $d^5$, moving in an open slot formed in the standard A² for the purpose of limiting the movement and indicating the action of said beam.

The base-casting A is provided in its top with the opening A⁶, over which the platform A¹², (dotted lines, Fig. 2) rests in the usual manner. Openings A⁷ and A⁸ are also formed in the top of the base-casting A, Figs. 1 and 11, through which pass, respectively, the rods $b^6$ and F.

From the foregoing description it is apparent that I have provided between the track E⁷ and the price-beam a longitudinally-movable rate-changing connection comprising a member longitudinally movable on said track E⁷, a member longitudinally movable on said price-beam, and a vertical pivotal connection between said members, with means for breaking said pivotal connection and non-pivotally connecting one of said members to the other member preliminary to and maintaining said non-pivotal connection during the adjustment of the rate per unit, so that the relative vertical position of said members and said vertical connection are maintained at all times during said adjustment of the rate per unit and, furthermore, that in combination therewith I have provided means for locking and unlocking one of said members to said rate-bar of the price-beam at the different rate-representing points or notches on said beam, as well as for unlocking said member therefrom substantially simultaneously with the breaking of said pivotal connection and non-pivotally connecting one of said members to the other member, so that adjustments of the rate per unit may be made, as aforesaid, and the member on said price-beam locked to said rate-bar of said price-beam to render the rate invariable except by manipulation and, furthermore, that in combination therewith I have provided means for locking said member to the rate-bar of the price-beam consisting of a series of substantially V-shaped notches upon the upper edge of the rate-bar of the price-indicating beam, said notches being adapted to be engaged by one or more substantially V-shaped projections carried by said member movable upon said price-beam, and said member is locked and unlocked from said price-beam, respectively, by engaging and disengaging said V-shaped projections and notches, so that the load is transmitted to the track $E^7$, thence to member $E^2$ through the member $E^5$ of the vertical connection $E^2$, and from said member E said load is transmitted by said V-shaped projections to the price-beam.

Having now fully described the construction of the several parts of my invention, I will now proceed to describe their operation.

When weight is placed upon the platform, the proportionate weight thereof is transferred to the knife-edged pivots $b^4$ and $b^5$ of the platform-lever B, and through these pivots said weight is transferred to the respective rods $b^6$ and F, engaging said pivots, and through these rods said weight is transferred to either or both said track $E^7$ and said weighing-beam A' by reason of these rods connecting with said track and beam. In the operation of weighing or pricing said pivots $b^4$ and $b^5$ move vertically upward and downward below and in a vertical line with the center of said weighing and price beam and track $E^7$ for the purpose of preventing strain or side draft upon the various connections intermediate said pivots and respective beams. The counterpoise-cup $a^7$, suspended from the weighing-beam, is adapted to counterbalance the weight of the platform, its levers B and C, and the price-poise E on the price-beam. Consequently there is a constant strain upon the steelyard $b^6$, which, together with rod F, engaging pivots $b^5$, hold said track $E^7$ at all times in an operative position.

The track $E^7$ by reason of its connection bodily moves vertically upward and downward in horizontal parallelism in the operation of weighing or pricing and imparts movement to the price-beam through the connection $E^2$, engaging with pivot E' of the price-poise E. To change the price per pound, place the thumb and finger upon handle J and rigid part J', respectively. Press them together, which movement revolves shaft I, places spring $i^5$ under tension, moves forging $i$ to a lower level to the left in Fig. 7, which movement withdraws the locking projections $i^4$ from engagement with the notches in the bar D' and moves the pins or bearings $i^3$ downward and in the instance shown outward to engage in the openings or bearing-seats F' in connection $E^2$ for the purpose of rigidly locking said connection $E^2$ to the said price-poise. Then move the price-poise until its indicating projections $e$ or $e'$ point to the proper price per pound. Then release said finger-pieces J and J', thus permitting the spring $i^5$ to return said parts upward to the position shown in Fig. 8, in which position the poise E is rigidly locked to bar D', and the connection $E^2$ is unlocked from poise E and has a free movement on the knife-edges of said pivot E' for the purpose of accommodating the differences in the arcs of movement caused by reason of said connection being operated at greater or less distances from the fulcrum of the price-beam. It will be obvious that without means for locking the rate connection vertically preliminary to and during the movement of said poise to change the rate per pound said connection would or could not remain in a vertical position during such movement of said poise, and it is of vital importance that said connection remain at all times in a perfectly vertical position, and especially so during the operation of weighing or pricing. It will therefore be readily understood that while I have shown and described certain specific means for breaking the pivotal connection between said relatively movable price-beam and rate connection and non-pivotally connecting same only during said relative movement yet I do not desire to be confined to this specific construction, and in construing the claims of this particular construction, arrangement, and manner of operation of the parts said claims shall be construed to cover the substantial equivalents of the heretofore-described means coöperating with the locking devices of said price-poise for holding said rate connection in a vertical position and also for maintaining the relative vertical position of said members E and $E^5$ of said rate connection during the changing of the rate per unit.

The locking means or bearing projections may be set to move at any desired angle with relation to the beam, it only being necessary that the rate connection should be locked in vertical position during the relative movement of the price or rate poise and price-beam in changing the pricing or rate per unit, and hence I do not wish to be limited to the particular angle illustrated. It is obvious that said pins or bearings $i^3$ being separated from each other and being different distances from the fulcrum of the price-beam and being in the plane of the relative movement of the price-beam and rate connection form a relatively long bearing in said plane and retreating from the fulcrum of the price-beam to form a non-pivotal connection for the rate connection during the changes in the rate per unit.

I specifically disclaim that the broader scope of my invention stated in those claims involving the track and not including the vertical rods or the pivotal bearings near opposite ends thereof for connecting with the load-receivers or not otherwise distinguishingly limited relates to constructions other than those in which the track $E^7$ moves bodily in horizontal parallelism.

Having now fully described my invention, so that others skilled in the art can freely make, use, and operate the same when this exclusive grant shall cease to operate, what I claim, and desire to secure by Letters Patent, is—

1. In a price-scale, the combination with a weight-receiving member, weighing and price beams mounted in independent bearings and lying in proximity to each other and swinging in the same vertical plane, connections between the beams and weight-receiving member, the connection between the price-beam and weight-receiving member being relatively adjustable longitudinally of the beam, and poises sliding on the beams, of a counterpoise-cup suspended from the end of the lower beam and an independent counterpoise-cup suspended from the upper beam and in substantially the same horizontal plane with the first-mentioned cup, the counterpoise-rod connecting with the upper beam being deflected laterally at an intermediate point to avoid contact with the lower beam; substantially as described.

2. A price-scale comprising a fulcrumed price-beam having a value-poise sliding thereon; a support for the article to be weighed connected with a counterbalanced track mounted adjacent to said price-beam; a rate-poise moving on said price-beam; a pivoted connection between said rate-poise and said track; and means for locking said pivoted connection rigidly to said rate-poise at a series of different points, preliminary to and for holding it locked during the movement of said rate-poise in changing the rate unit; substantially as specified.

3. A price-scale comprising a fulcrumed price-beam, having a value-poise thereon; a supporting mechanism for the article to be weighed embodying knife-edged pivots, a track mounted to have a free vertical movement adjacent to said price-beam, said track having vertical rods at opposite ends connecting with said knife-edged pivots on the supporting mechanism for the article to be weighed; a variable connection between said track and said price-beam, and a lever $A'$ adapted to counterbalance said track and said variable connection, substantially as specified.

4. A price-scale comprising a fulcrumed price-beam having a value-poise thereon; a supporting mechanism for the article to be weighed having knife-edged pivots, a track mounted to have a free vertical movement adjacent to said price-beam, said track having oppositely-located vertical rods connecting with said knife-edged pivots on the supporting mechanism for the article to be weighed; a rate-poise movably mounted upon said price-beam; a pivoted connection between said poise and said track; means for locking said connection to said rate-poise preliminary to and holding it locked during the movement of said poise in changing the rate per unit; and a lever $A'$ adapted to counterbalance said track, said connection and said rate-poise, substantially as specified.

5. In a price-scale, the combination of a lever B, a weight-receiving member, said lever B being provided on its free end with laterally-projecting arms $b$ and $b'$ provided respectively with knife-edged pivots $b^4$ and $b^5$; a counterbalanced track connected with said pivots $b^4$ and $b^5$, said track being mounted adjacent to a price-beam; said track being connected with the said pivots by means of vertical rods at opposite ends of said track and engaging with said pivots; and a variable connection between said track and the price-beam for changing the rate unit; substantially as specified.

6. In a price-scale the combination of a weighing or counterbalancing lever $A'$; a platform supported by levers B and C in the usual manner, said lever B being provided on its free outer end with lateral arms $b$ and $b'$ whose extreme ends are provided with knife-edged pivots $b^4$ and $b^5$ respectively; a track connected to said pivots $b^4$ and $b^5$ by means of vertical rods $b^6$ and F, said rod $b^6$ connecting also with the weighing or counterbalancing lever $A'$; a price-beam fulcrumed adjacent to said track; and a variable pivoted connection between said track and said price-beam, whereby the varying of said connection changes the rate unit; substantially as specified.

7. In a price-scale the combination of a weighing or counterbalancing lever $A'$; a platform supported by levers B and C in the usual manner, said lever B being provided on its free end with lateral arms $b$ and $b'$ whose extreme ends are provided with knife-edged pivots $b^4$ and $b^5$ respectively; a track connected to said pivots $b^4$ and $b^5$ by means of vertical rods $b^6$ and F, said rod $b^6$ connecting also with the weighing or counterbalancing lever $A'$; a price-beam fulcrumed adjacent to said track; a rate-poise movably mounted upon said price-beam; a connection pivoted to said rate-poise and engaging said track; and means for locking said connection to said rate-poise during the movement of said poise to change the rate unit; substantially as specified.

8. In a price-scale the combination of a weighing or counterbalancing lever $A'$; a platform supported by levers B and C in the usual manner, said lever B being provided on its free outer end with lateral arms $b$ and $b'$ whose extreme ends are provided with knife-edged pivots $b^4$ and $b^5$ respectively; a track connected to said pivots $b^4$ and $b^5$ by means of vertical rods $b^6$ and F, said rod $b^6$ connecting also with the weighing or counterbalancing lever $A'$; a price-beam fulcrumed adjacent to said track; a rate-poise movably mounted upon said price-beam and provided with an operating member; a connection pivoted to said rate-poise and connecting with a traveler mounted on said track; the said operating member on said rate-poise operating means for locking said connection to said rate-poise during the movement of said poise in changing the rate unit, said member being adapted to be operated preliminary to the movement of said poise, substantially as specified.

9. In a weighing or price scale the lever B provided on its free outer end with lateral arms $b$ and $b'$ provided respectively with knife-edged pivots $b^4$ and $b^5$, said pivot $b^4$ being provided on its lower side with one knife-edge, and said pivot $b^5$ being provided with one knife-edge upon its lower side and one knife-edge upon its upper side, substantially as specified.

10. In a weighing or a price scale a lever provided with load-receiving pivots 2 and 3 and fulcrumed pivots 4 and 5; said lever being provided with two counterpoise-pivots located at some distance apart but whose knife-edges are equal distances from the fulcrum-pivots of said lever, one of said counterpoise-pivots being provided with one knife-edge upon its lower side, and said second counterpoise-pivot being provided with one knife-edge upon its lower edge and one knife-edge upon its upper edge; substantially as specified.

11. In a weighing or price scale, the lever B provided with load and fulcrum pivots, and arms $b$ and $b'$ each arm being provided with a knife-edged counterpoise-pivot the two located some distance apart but equal distances from the fulcrum-pivots of said lever B and in the same horizontal plane therewith and with the knife-edges of said load-pivots; substantially as described.

12. In a weighing or price scale the combination of the lever B having load-pivots 2 and 3 and fulcrumed pivots 4 and 5; a pivot 6 in said lever B carrying loop 7 in which engages counterpoise-pivot 8 of lever C provided with load-pivots 9 and 10 and fulcrum-pivots 11 and 12; said lever B being provided on its free end with lateral arms $b$ and $b'$, provided respectively with knife-edged counterpoise-pivots $b^4$ and $b^5$ located some distance apart and whose knife-edges are equal distances from the fulcrum-pivots 4 and 5, said pivot $b^5$ being provided with one knife-edge upon its lower side, and one knife-edge upon its upper side, substantially as specified.

13. In a price-scale, the combination of a lever provided with load-receiving pivots 2 and 3 and fulcrum-pivots 4 and 5; said lever being provided with two counterpoise-pivots located at some distance apart but whose knife-edges are equal distances from the fulcrum-pivots of said lever, a track connected to said pivots $b^4$ and $b^5$; a lever A' connected to and counterbalancing said track; a price-beam fulcrumed adjacent to said track; and a movable pivoted connection between said price-beam and said track; substantially as specified.

14. In a price-scale the combination of a lever provided with load-receiving pivots 2 and 3 and fulcrum-pivots 4 and 5; said lever being provided with two counterpoise-pivots located at some distance apart but whose knife-edges are equal distances from the fulcrum-pivots of said lever, a track connected to said pivots $b^4$ and $b^5$ by vertical arms $b^6$ and F, said track being loosely pivoted to the rod $b^6$; a lever A' for counterbalancing said track; a price-beam fulcrumed adjacent to said track; and a movable pivoted connection between said price-beam and said track; substantially as specified.

15. In a weighing or price scale the combination of the lever B having load-pivots 2 and 3 and fulcrum-pivots 4 and 5; a pivot 6 in said lever B carrying loop 7 in which engages counterpoise-pivot 8 of lever C provided with load-pivots 9 and 10 and fulcrum-pivots 11 and 12; said lever B being provided on its free end with lateral arms $b$ and $b'$, whose extreme ends are provided respectively with knife-edged counterpoise-pivots $b^4$ and $b^5$ located some distance apart and whose knife-edges are equal distances from the fulcrum-pivots 4 and 5; a track mounted upon rods $b^6$ and F whose lower ends engage the respective pivots $b^4$ and $b^5$; said track being pivoted to the rod $b^6$; a weighing-beam connected to the upper end of the rod $b^6$; a price-beam fulcrumed intermediate said weighing-beam and said track; and a movable connection intermediate the price-beam and said track; substantially as specified.

16. In a price-scale the combination of a lever provided with load-receiving pivots 2 and 3 and fulcrumed pivots 4 and 5; said lever being provided with two counterpoise-pivots located at some distance apart but whose knife-edges are equal distances from the fulcrum-pivots of said lever; a track carried on vertical rods engaging with knife-edges $b^4$ and $b^5$; a lever A' for counterbalancing said track; a price-beam fulcrumed adjacent to said track; a rate-poise movably mounted upon said price-beam; a connection pivoted to said rate-poise and coöperating with said track; and means for locking said pivoted connection to said rate-poise preliminary to and during the movement of said poise in changing the price unit; substantially as specified.

17. In a price-scale the combination of a lever provided with load-receiving pivots 2 and 3 and fulcrum-pivots 4 and 5; said lever being provided with two counterpoise-pivots located at some distance apart but whose knife-edges are equal distances from the fulcrum-pivots of said lever; a track carried on vertical rods engaging with knife-edges $b^4$ and $b^5$; a lever A' for counterbalancing said track; a price-beam fulcrumed adjacent to said track; a rate-poise movably mounted upon said price-beam; a connection pivoted to said rate-poise and coöperating with said track; and an operating-handle on said poise-actuating means for alternately locking said poise to the beam and said pivoted connection to said poise, substantially as specified.

18. In a price-scale the combination of the fulcrumed price-beam having a notched portion upon which a rate-indicating poise is adapted to move; a series of projections carried by said poise and adapted to engage in the notches on said beam for locking said poise to said beam; a pivot carried by said poise, from which pivot extends a connection joining said pivot to a weight-receiving member; said connection being adapted to slide upon a horizontal track connected with the weight-receiving member; a lever A' for counterbalancing said track; an operating member for moving said projections into and out of engagement with the notches on said beam; and means coöperating with said projections and operated by said member at an angle to said connection to lock said connection to the rate-poise when said projections are moved to unlock the poise from said beam, substantially as specified.

19. In a price-scale, the combination of a price-beam, a rate-poise thereon, a knife-edged pivot in said rate-poise, a track parallel with said price-beam, a support for the article to be weighed connected to said track, a connection E² formed L-shaped at its upper end and provided with bearings E³ for said knife-edged pivot, a member on connection E² and engaging said track, and means for locking said connection to said rate-poise and holding it locked during the movement of said poise in changing the rate unit, substantially as specified.

20. In a price-scale, the combination of the price-beam, a rate-poise thereon, a knife-edged pivot E' in said poise, said pivot being provided with knife-edged shoulders L, L', L², and L³; a counterbalanced track mounted parallel with said beam and connected to the support for the article to be weighed, a connection pivoted to the knife-edged pivot E', and movably connected with said track, and means for locking said connection to said rate-poise during its movement in changing the rate unit, substantially as specified.

21. In a price-scale, the combination of a price-beam, a rate-poise thereon, a knife-edged pivot on said poise, a track mounted parallel to said beam and connected to the support for the article to be weighed, a lever connected to said track, a poise on said lever, a connection between said knife-edged pivot and said track, a series of projections carried by said poise for locking said connection thereto, and means for moving said projections laterally to said connection to lock said connection to said rate-poise during its movement in changing the rate per unit, substantially as specified.

22. In a price-scale, the combination of a price-beam, a rate-poise thereon, a knife-edged pivot in said rate-poise, a counterbalanced track mounted parallel with said beam and connected to the support for the article to be weighed, a connection between said knife-edged pivot and said track, an opening in said connection, a projection carried by said rate-poise, and means for operating the projection to engage the opening in said connection for locking said connection to said price-poise during its movement in changing the rate unit, substantially as specified.

23. In a price-scale, the combination of the separately-pivoted weighing and price beams, each mounted in bearings stationary with reference to the other; a weight-receiving mechanism connected to said weighing-beam; a variable rate connection between said price-beam and weight-receiving mechanism; counterpoise-weights pivoted to the respective mechanisms, said counterpoise-weights being arranged adjacent to each other, and a guard G secured to the framework and having openings therein to receive the counterpoise-weights and prevent their swinging; substantially as specified.

24. In a price-scale, the combination of independently-pivoted weighing and pricing mechanisms, and a variable rate connection between said mechanisms, said connection consisting of a rate-poise upon the pricing mechanism and a pivotally-supported connection, and means for locking and holding said connection to said rate-poise at a series of different points during the movement in changing the rate unit, substantially as specified.

25. The combination with the base-casting A and its opening A⁶, a scale-platform supported over said opening A⁶, and platform-levers supporting said platform of openings A⁷ and A⁸ in said base-casting, said openings being located in line with each other and at some distance apart, separately-pivoted weighing and price beams; a horizontal part intermediate said scale-platform and price-beam, said horizontal part being invariably connected to said weighing-beam; vertical rods connecting one of said scale-platform levers and horizontal part, said rods passing through said openings A⁷ and A⁸; and a variable rate connection between said price-beam and horizontal part, substantially as specified.

26. The combination with the pivot E', having its respective ends formed with the series of knife-edges, and the tapering shoulders L, L', L² and L³, of a bearing-seat for said knife-edges, substantially as specified.

27. The combination of a pivot portion having knife-edged bearings formed thereon, said knife-edges being formed below the exterior surface of said pivot portion, and having tapering knife-edged shoulders extending abruptly from the line of the knife-edges of the pivot to the exterior surface of the pivot portion, and a seat for each knife-edge of the pivot, the edges of which are adapted to contact with the knife-edge of the tapering shoulders, substantially as specified.

28. The combination with the scale-beam, of a poise thereon, said poise being formed in two parts removably secured together, a slot in said poise through which the beam slides, a lug or boss projecting from one of the parts of said poise, into a recess formed in the other part of said poise, a knife-edged pivot mounted in said lug or boss, said knife-edged pivot extending through an enlarged opening in the attached part of said poise, substantially as specified.

29. In a price-scale, the combination with separately-pivoted weighing and price beams provided with poises, of a variable rate mechanism for the price-beam; a pivoted lever connected to the support for the article to be weighed, said lever having a series of knife-edged pivots located in line with but apart from each other, said knife-edged pivots being connected with the weighing-beam, while both said pivots are connected to said variable rate mechanism; said weighing and price beams being mounted vertically one above the other, and said knife-edged pivots being mounted vertically below said beams, substantially as specified.

30. In a price-scale, the combination with separately-fulcrumed weighing and price beams, of a variable rate mechanism including a vertically-movable horizontal member and a longitudinally-movable connection between said member and said price-beam, a support for the article to be weighed, a fulcrumed lever pivotally connected to said support and having a series of knife-edged counterpoise-pivots parallel with and equal distances from the fulcrum-pivots of said lever; said weighing-beam and said horizontal member being connected with said counterpoise-pivots in said lever; substantially as specified.

31. In a price-scale, the combination with separately-fulcrumed weighing and price beams, of a variable rate mechanism including a vertically-movable horizontal member and a longitudinally-movable connection between said member and said price-beam, a support for the article to be weighed, a fulcrumed lever pivotally connected to said support and having a series of knife-edged counterpoise-pivots parallel with and equal distances from the fulcrum-pivots of said lever; said weighing-beam and said horizontal member being connected with said counterpoise-pivots in said lever; said beams, variable rate mechanism, and said counterpoise-pivots in said lever being in the same vertical plane; substantially as specified.

32. In a scale, the combination with a weight receiver or platform, a mechanism embodying a lever supporting said platform, a weighing-beam connected with said lever, and a poise upon said weighing-beam and indicating pounds and ounces, of a bar connected to the weight-supporting lever and adapted to vibrate bodily in an approximately vertical plane and in horizontal parallelism, a price-beam adjacent to said bar, and a longitudinally-movable connection between the price-beam and said bar, substantially as specified.

33. In a scale, the combination with the weight receiver or platform, a mechanism embodying a lever supporting said platform, a weighing-beam connected with said lever, and a poise upon said weighing-beam and indicating-weight, of a bar loosely connected at one end to the connection between said weighing-beam and lever and rigidly connected at its remaining end to a rod connecting with said lever, a price-beam adjacent to said bar, and a longitudinally-movable connection between said bar and price-beam, substantially as specified.

34. In a scale, the combination with the weight receiver or platform, and a mechanism embodying a lever supporting said platform, of a bar connected at opposite ends to said lever by downwardly-projecting rods which also form the supports for said bar and are pivotally connected with the lever, a price-beam mounted adjacent to said bar and in vertical alinement with said bar and the point of connection between said lever and said downwardly-projecting rods, a longitudinally-movable connection between said rod and price-beam, and means independent of said price-beam for counterbalancing the weight of said bar and said longitudinally-movable connection, substantially as specified.

35. In a price-indicating scale, the combination of a load-receiving member connected to a movable track, a price-indicating beam fulcrumed parallel to said track and located in a higher horizontal plane from that in which said track is located, a series of substantially V-shaped notches on the upper edge of a member of said price-beam; a rate-poise movable on said price-beam and carrying a substantially V-shaped projection fitting into said notches, a member movable on said track, a vertical connection between said rate-poise and said member, said track drawing the rate-poise downward by said vertical connection and said projection of said rate-poise transmitting said draft to said notches on the price-beam during the operation of indicating the price of a load, and means for substantially simultaneously disengaging said projection of said rate-poise and said notches of said price-beam and maintaining the vertical position of said vertical connection during the changing of the rate per unit, substantially as specified.

36. In a price-indicating scale, the combination of a load-receiving member connected to a movable track, a price-indicating beam fulcrumed parallel to said track and located in a higher horizontal plane from that in which said track is located, a series of substantially V-shaped notches on the upper edge of a member of said price-beam; a rate-poise movable on said price-beam and carrying a series of substantially V-shaped projections fitting into said notches, a member movable on said track, a vertical connection between and pivotally connected to said rate-poise and said member, said track drawing the rate-poise downward by said vertical connection and said series of projections of said rate-poise transmitting said draft to said notches on the price-beam during the operation of indicating the price of a load, and means for substantially simultaneously disengaging said projections of said rate-poise and said notches of said price-beam and maintaining the vertical position of said vertical connection during the changing of the rate per unit, substantially as specified.

37. In a price-indicating scale, the combination of a load-receiving member connected to a movable track, a price-indicating beam fulcrumed parallel to said track and located in a higher horizontal plane from that in which said track is located, a series of substantially V-shaped notches on the upper edge of a member of said price-beam; a rate-poise movable on said price-beam and carrying a series of substantially V-shaped projections fitting into said notches, a member movable on said track, a vertical connection between and pivotally connected to said rate-poise and said member, said track drawing the rate-poise downward by said vertical connections and said series of projections of said rate-poise transmitting said draft to said notches on the price-beam during the operation of indicating the price of a load, means for disengaging said projections of said poise and said notches of said beam, and means for maintaining the vertical position of said vertical connection during the changing of the rate per unit, both of said means operating substantially in unison, substantially as specified.

38. In a price-indicating scale, the combination of a load-receiving member connected to a movable track, a price-indicating beam fulcrumed parallel to said track and located in a higher horizontal plane from that in which said track is located, a series of substantially V-shaped notches on the upper edge of a member of said price-beam; a rate-poise movable on said price-beam and carrying a series of substantially V-shaped projections fitting into said notches, a member movable on said track, a vertical connection between and pivotally connected to said rate-poise and said member, said track drawing the rate-poise downward by said vertical connection and said series of projections of said rate-poise transmitting said draft to said notches on the price-beam during the operation of indicating the price of a load, means for disengaging said projections of said poise and said notches of said beam; and members separated from each other in the plane of movement of said poise, connection and member for maintaining the vertical position of said connection and the vertical alinement of said poise and member during the changing of the rate per unit, said means and said maintaining members being operated substantially simultaneously, substantially as specified.

39. In a price-indicating scale, the combination of a load-receiving member connected to a movable track, a price-indicating beam fulcrumed parallel to said track and located in a higher horizontal plane from that in which said track is located, a series of substantially V-shaped notches on the upper edge of a member of said price-beam; a load-transmitting connection between said track and price-beam consisting of a weight-poise movable on said price-beam and carrying a series of substantially V-shaped projections fitting into said notches and a member movable on said track and a vertical connection pivoted between said rate-poise and said member; said track drawing the rate-poise downward by said load connection and said series of projections transmitting said draft to said notches on the price-beam during the operation of indicating the price of a load, means carried by said load connection on opposite sides of the points of pivotal connection of said vertical connection for maintaining the vertical alinement of said poise and said member during the changing of the rate per unit; and means, operating substantially simultaneously with the aforesaid means, for disengaging said projections of said poise and said notches on said beam, and maintaining said disengagement during the changing of the rate per unit; substantially as specified.

40. In a price-indicating scale, the combination of a load-receiving member connected to a movable track, a price-indicating beam fulcrumed parallel to said track and located in a higher horizontal plane from that in which said track is located, a series of substantially V-shaped notches on the upper edge of a part of said price-beam, a member movable on said price-beam and carrying a series of substantially V-shaped projections fitting into said notches, a second member movable on said track, a vertical connection between said members and pivotally connected to said member on said beam, said track drawing the rate-poise downward by said vertical connection and said series of projections of said rate-poise transmitting said draft to said notches on the price-beam during the operation of indicating the price of a load, means for breaking said pivotal connection between said members and non-pivotally connecting one of said members with the other, and means for disengaging said projections and notches, said non-pivotal connection and said disengagement being maintained during the changing of the rate per unit, substantially as specified.

41. In a price-indicating scale, the combination of a load-receiving member connected to a movable track, a price-indicating beam fulcrumed parallel to said track and located in a higher horizontal plane from that in which said track is located, a series of substantially V-shaped notches on the upper edge of a member of said price-beam; a load-transmitting connection between said track and price-beam consisting of a member movable on said price-beam and carrying a series of substantially V-shaped projections fitting into said notches, and a second member movable on said track, and a third vertical member pivoted between said two members; said track drawing the beam downward through said load connection and the projections of said first member transmitting said load to the beam by engagement with said notches; means carried by one member of said load connection near opposite sides of said load connection and engaging in correspondingly-positioned seats in a separate member of said load connection during the changing of the rate per unit to maintain the vertical alinement of said load connection during said change; and means for disengaging said projections and notches during the changing of the rate per unit, substantially as specified.

42. In a price-indicating scale, the combination with the relatively movable price-beam and connection interposed between said beam and load-receiver, said connection engaging with said beam during the pricing operation, and means carried by said connection and having a bearing having contacting-points arranged in a vertical plane at substantially right angles to the fulcrum of the beam for holding said connection vertically only during said relative movement to change the rate per unit, substantially as specified.

43. In a price-indicating scale, the combination of a price-beam, a horizontal part adjacent said beam and connected to the load-receiver, a horizontally-movable connection between said beam and horizontal part, and means carried by said connection and having a bearing having contacting points arranged in the plane of movement of said connection, said bearing being interposed between said beam and said horizontal part for supporting said connection in a vertical position during the movement of said connection in changing the rate per unit, substantially as specified.

44. In a price-indicating scale, the combination of a price-beam, a horizontal part adjacent said beam and connected to the load-receiver, a member movable longitudinally on said beam, a vertical connection interposed between said member and horizontal part and movable longitudinally of said horizontal part, said member on said beam and said vertical connection forming the variable rate connection between said beam and horizontal part, said rate connection carrying bearings separated from each other in the plane of relative movement of said rate connection, said bearings coöperating with said member on said beam and said connection on said horizontal part for holding said vertical connection vertically during the adjustment of said rate connection, substantially as specified.

45. In a price-indicating scale, the combination of a price-beam, a horizontal part adjacent said beam and connected to the load-receiver, a variable rate connection intermediate said beam and said horizontal part including separate members movable longitudinally on said beam and said horizontal part respectively and a vertical member intermediate and pivoted to said members; a bearing having contacting points arranged in the plane of the movement of said rate connection carried by one member of said rate connection and engaging with another member of said rate connection only during said movement of said rate connection to change the rate per unit, substantially as specified.

46. In a price-indicating scale, the combination of a price-beam, a horizontal part adjacent said beam and connected to the load-receiver, a variable rate connection intermediate said beam and said horizontal part including separate members movable longitudinally on said beam and said horizontal part respectively and a vertical member intermediate and pivoted to said members; a bearing having contacting points separated in the plane of the movement of said rate connection carried by one member of said rate connection and engaging with another member of said rate connection only during said movement of said rate connection to change the rate per unit, and means for moving said bearing into engagement with said other member of said rate connection preliminary to and for maintaining said connection during the movement of said rate connection to change the rate per unit, substantially as specified.

47. In a price-indicating scale, the combination of a price-beam, a horizontal part adjacent said beam and connected to the load-receiver, a variable rate connection intermediate said beam and said horizontal part including separate members movable longitudinally on said beam and said horizontal part respectively and a vertical member intermediate and pivoted to said members; movable bearings separated from each other in the plane of movement of said rate connection and carried by one member of said rate connection, coöperating bearings on one of said other members of said rate connection, and means for moving said bearings to coöperate with each other preliminary to and for maintaining said coöperation during the movement of said rate connection in changing the rate per unit, substantially as specified.

48. In a price-indicating scale, the combination of a price-beam, a horizontal part adjacent said beam and connected to the load-receiver, a variable rate connection intermediate said beam and said horizontal part including separate members movable longitudinally on said beam and said part respectively and a vertical member intermediate and pivoted to said members; movable bearing projections separated from each other in the plane of movement of said rate connection and carried by one member of said rate connection, correspondingly-positioned bearing-seats carried by one of said other members of said rate connection, and means for moving said movable bearing projections into engagement with said bearing-seats preliminary to and maintaining said engagement of said bearing projections and seats during the movement of said rate connection in changing the rate per unit, substantially as specified.

49. In a price-indicating scale, the combination of a price-beam, a horizontal part adjacent said beam and connected to the load-receiver, a variable rate connection intermediate said beam and said horizontal part including separate members movable longitudinally on said beam and said part respectively and a vertical member intermediate and pivoted to said members; movable bearing projections separated from each other in the plane of movement of said rate connection and carried by one member of said rate connection on opposite sides of the pivotal connection between said vertical member and said other members of said rate connection, correspondingly-positioned bearing-seats carried by one of said other members of said rate connection, and means for moving said movable bearing projections into engagement with said bearing-seats preliminary to and maintaining said engagement of said bearing projections and seats during the movement of said rate connection in changing the rate per unit, substantially as specified.

50. In a price-indicating scale, the combination of the load-receiver price-beam and vertical connection interposed between and forming one of the elements uniting said beam and the load-receiver and movable with relation to said beam, said connection engaging with said beam during the pricing operation, bearings separated from each other horizontally in a vertical plane at substantially right angles to the fulcrum of the beam, said bearings coöperating with correspondingly-positioned seats for said bearings rigid with a member of said connection to hold same vertically during said relative movement to change the rate per unit, said bearings being mounted upon a member separate from said member of said connection provided with said seats, substantially as specified.

51. In a price-indicating scale, the combination of the relatively movable price-beam and vertical connection interposed between said beam and the load-receiver, said connection engaging with said beam during the pricing operation, bearings separated from each other horizontally in a vertical plane at substantially right angles to the axis of the beam, said bearings being adapted to move into engagement with correspondingly-positioned seats for said bearings, said seats being rigid with a member of and at the upper end of said connection for holding said connection vertically during said relative movement to change the rate per unit, and means for moving said bearings into engagement with said bearing-seats preliminary to and for maintaining said engagement during said relative movement, said bearings being movably mounted upon a member separate from said member of said connection provided with said seats, substantially as specified.

52. In a price-indicating scale, the combination of the relatively movable price-beam and vertical rate connection, said rate connection including a member relatively slidable on a member of said beam and a vertical member pivotally connected to said slidable member and the load-receiver, a series of substantially V-shaped rate-representing notches on the upper edge of said member of said price-beam, a series of substantially V-shaped projections carried by said member of said rate connection relatively slidable on said member of said price-beam and adapted to engage in said notches to lock the upper end of said rate connection to said price-beam, bearings separated from each other in the plane of relative movement of said beam and rate connection, correspondingly-positioned bearing-seats carried by a member of said rate connection, said bearings being movably mounted upon a member separate from said member of said rate connection provided with said bearing-seats, and means for moving said bearings into engagement with said bearing-seats and substantially simultaneously disengage said V-shaped projections and notches preliminary to and for maintaining said engagement of said bearings and bearing-seats and said disengagement of said V-shaped projections and notches during said relative movement of said beam and rate connection to change the rate per unit, substantially as specified.

53. In a price-indicating scale, the combination of the relatively movable price-beam and vertical rate connection, said rate connection including a member relatively slidable on a member of said beam and a vertical member pivotally connected to said slidable member and the load-receiver, a series of substantially V-shaped rate-representing notches on the upper edge of said member of said price-beam, a series of substantially V-shaped projections carried by said member of said rate connection relatively slidable on said member of said price-beam and adapted to engage in said notches to lock the upper end of said rate connection to said price-beam, bearings separated from each other in the plane of relative movement of said beam and rate connection, said bearings being on opposite sides of the pivotal plane of the vertical member of said rate connection, correspondingly-positioned bearing-seats carried by a member of said rate connection, said bearings being movably mounted upon a member separate from the member of said rate connection carrying said bearing-seats, means for moving said bearings into engagement with said bearing-seats and substantially simultaneously disengage said V-shaped projections and notches preliminary to and for maintaining said engagement of said bearings and bearing-seats and said disengagement of said V-shaped projections and notches during said relative movement of said beam and rate connection to change the rate per unit, and a tare-beam invariably connected to the load-receiver and counterbalancing same as well as said rate connection, substantially as specified.

54. In a price-scale, the combination with a relatively movable price-beam and rate connection, a load-receiver pivotally connected through intermediate connections with said rate connection, a fulcrum for said beam; said rate connection including a member on said beam and relatively movable with reference to the fulcrum of said beam, and a second member pivotally connected to said first member; two rigidly-connected portions at different distances from the fulcrum of said beam and movable into different elevations; two rigidly-connected defined seats for the ends of said portions at correspondingly different distances from the fulcrum of said beam and carried by a member of said rate connection; said portions being movably mounted independent of said member of said rate connection carrying said seats, said portions and said seats being on opposite sides of a vertical plane passing through the pivotal connection of said members of said rate connection said portions being independent of said member provided with said seats; and means for moving the ends of said portions into engagement with said seats, for non-pivotally connecting said portions and said member provided with said seats, preliminary to and during the change of the rate per unit, substantially as specified.

55. In a price-scale, the combination with a relatively movable price-beam and rate connection, a load-receiver pivotally connected with said rate connection through intermediate connections, a fulcrum for said beam; said rate connection including a member on said beam and relatively movable with reference to the fulcrum of said beam, and a second member pivotally connected to said first member; two rigidly-connected portions at different distances from the fulcrum of said beam and movable into different elevations; two rigidly-connected defined seats for the ends of said portions at correspondingly different distances from the fulcrum of said beam and carried by a member of said rate connection and said portions being independent of said member provided with said seats; said portions being movably mounted independent of said member of said rate connection carrying said seats; a series of substantially V-shaped notches on the rate member of said beam, a series of substantially V-shaped projections carried by said member on said beam and adapted to engage said notches; and means for moving the ends of said portions into engagement with said seats and disengaging said notches and projections, preliminary to and during the change of the rate per unit, substantially as specified.

56. In a price-scale, the combination with a relatively movable price-beam and rate connection, a load-receiver pivotally connected to said rate connection through intermediate connections, a fulcrum for said beam; said rate connection including a member on said beam and relatively movable with reference to the fulcrum of said beam, and a second member pivotally connected to said first member; two rigidly-connected portions at different distances from the fulcrum of said beam and movable into different elevations; two rigidly-connected defined seats for the ends of said portions at correspondingly different distances from the fulcrum of said beam and carried by a member of said rate connection and said portions being independent of said member provided with said seats; said portions being movably mounted independent of said member of said rate connection carrying said seats; a series of substantially V-shaped notches on the rate member of said beam, a series of substantially V-shaped projections carried by said member on said beam and adapted to engage said notches; means for moving the ends of said portions into engagement with said seats and disengaging said notches and projections, preliminary to and during the change of the rate per unit; a suitably-fulcrumed tare-beam, a load-receiving pivot fixed upon said tare-beam, and a connection between said fixed load-pivot and the load-receiver; said tare-beam being adapted to counterbalance said rate connection, load-receiver and said seats; substantially as specified.

57. In a price-indicating scale, a price-beam, a platform-lever having a widened end, a connecting-frame directly hinged to the widened end of the lever at its two extremities, and suitable connection between the frame and the price-beam.

58. In a price-indicating scale, a price-beam, a platform-lever, a frame pivoted to the platform-lever, but having pivotal movement in one direction only, and a pivotal connection between the frame and the price-beam.

59. In a price-indicating scale, the connecting-frame and the platform-lever B having a pair of knife-edge connections at one end with the platform-framework and a pair of knife-edge connections with said frame at the opposite end.

60. In a price-indicating scale, a price-beam in combination with a bifurcated platform-lever, and suitable connections between the beam and lever, said connections having pivotal engagement with each of the two arms of the lever, and means independent of the price-beam for holding the connecting means in an upright position.

61. In a price-indicating scale, a price-beam fixed against longitudinal movement, a platform-lever, a frame pivotally connected with said platform-lever at two points, a slidable connective member between said frame and said price-beam, and means for raising said frame.

62. In a price-indicating scale, a price-beam fixed against longitudinal movement, a platform-lever, a frame pivotally connected with said platform-lever, a slidable connecting element between said frame and said price-beam, a tare-beam suitably mounted in the framework of the scale, and link connection between said tare-beam and said frame.

63. In a price-scale, the combination of a price-beam; a horizontal part adjacent to said beam and connected to the load-receiver; and a shiftable rate connection between said beam and horizontal part including three members, two of which are respectively pivoted to opposite extremities of the third and movably engage said beam and part respectively, one of said three members being provided with a plurality of independent bearing-seats separated from one another by an appreciable distance, and another one of said members carrying a like plurality of separate bearings each adapted to one of said seats, said bearings and seats being normally disengaged, but constructed to be brought into engagement, whereby the members to which they respectively belong may be locked against rocking movement when the connection is to be shifted.

64. In a price-scale, the combination of a price-beam; a horizontal part adjacent to said beam and connected to the load-receiver; and a shiftable rate connection between said beam and horizontal part including three members, two of which are respectively pivoted to opposite extremities of the third and movably engage said beam and part respectively, one of said three members being provided with a plurality of independent bearing-seats separated from one another by an appreciable distance, and another of said members carrying a like plurality of separate bearings movably connected thereto and each adapted to one of said seats, said bearings and seats being normally disengaged, but constructed to be brought into engagement, whereby the members to which they respectively belong may be locked against rocking movement when the connection is to be shifted.

65. In a price-scale, the combination of a price-beam; a horizontal part adjacent to said beam and connected to the load-receiver; and a shiftable rate connection between said beam and horizontal part including three members, two of which are respectively pivoted to opposite extremities of the third and movably engage said beam and part respectively one of said three members being provided with a plurality of independent bearing-seats separated from one another by an appreciable distance, and another one of said members carrying a like plurality of separate bearings each adapted to one of said seats, said bearings and seats being normally disengaged, and means distinct from said bearings and seats but operatively arranged with reference to one of them for bringing the same into engagement with the other, whereby the members to which they respectively belong may be locked against rocking movement when the connection is to be shifted.

66. In a computing-scale, the combination of the price-beam, a platform-lever, the connecting-frame, having knife-edge connection with the said lever at two points, and slidable connecting means between the frame and the price-beam, substantially as described.

67. In a computing-scale, a price-beam, a platform-lever, and a frame having direct pivotal connection at at least two points with the lever, and through a movable member an adjustable connection with the price-beam; substantially as set forth.

68. In a computing-scale, a price-beam fixed against longitudinal movement, a platform-lever, a frame pivotally connected with said lever at two points, a slidable connective member between said frame and said price-beam, a tare-beam suitably mounted in the framework of the scale and pivotal connection between said tare-beam and said frame; substantially as set forth.

69. In a computing-scale, a price-beam, an upright connecting-frame, a platform-lever, said platform-lever having at one end pivotal connection at either side with the platform-framework, and at the other end pivotal connection at either side with said frame, and operative connection between said frame and said beam, substantially as set forth.

70. In a computing-scale, a price-beam, an upright frame, a platform-lever, said platform-lever having at one end pivotal connection at either side with the platform-framework, and at the other end pivotal connection at either side with the said frame, and an adjustable connecting element between the said frame and beam; substantially as described.

71. In a scale, the combination of a frame, the load-receiver, the longitudinally-stationary vertically-vibrating price-beam, the head-block adjustable on the price-beam, a horizontal guide for the head-block, two vertically-moving holders for the said guide, one at each end thereof, with which holders the guide can swing around a longitudinal axis and a balancing mechanism supported on the scale-frame for sustaining the weight of the guide-bar and of the load-receiver.

72. In a computing-scale, the combination of the platform the load-carrying lever mechanism below the platform, the computing-beam above the platform, the guide, the laterally-adjustable downwardly-pulling connecting device or draft-transmitter engaging with the computing-beam and supported on the guide, the knife-edges or pivots secured to the load-supporting lever mechanism one at each end of the guide, and guide-supports engaging the knife-edges on pivots whereby the guide is constantly held horizontal and receiving directly the thrust or draft thereof and permitting it to rock or vibrate relatively to the load-supporting lever while connected therewith, as set forth.

73. The combination of the platform-lever, the connecting means including a guide pivoted directly to said platform-lever at two pivotal points, whereby it is held continuously and uniformly in parallelism horizontally, said guide device being mounted to move independently of the fixed framework, the price-beam, the laterally-movable connecting-block connecting the guide and price-beam and means for balancing said guide with the platform-lever independently of the computing-beam, the said balancing means adapted to hold the guide upright.

74. A price-scale comprising a fulcrumed price-beam having a value-poise thereon, a supporting mechanism for the article to be weighed embodying knife-edge pivots, a freely-mounted vertically-moving bar adjacent to said price-beam, said bar having means at both of its opposite ends connecting it with said knife-edge pivots on the supporting mechanism for the article to be weighed, a variable connection between said bar and said price-beam, and a lever adapted to counterbalance said bar and said variable connection.

IRA C. KOEHNE.

Witnesses:
L. C. LEOTY,
GEO. GREENWAY.